United States Patent
Bornschein

(10) Patent No.: US 6,255,938 B1
(45) Date of Patent: Jul. 3, 2001

(54) DEVICE FOR THE INPUT AND READ-OUT OF DATA

(75) Inventor: Hans-Jürgen Bornschein, Schwerte (DE)

(73) Assignee: F. H. Papenmeier Gmbh & Co. KG, Schwerte (DE)

( * ) Notice: Subject to any disclaimer, the term of this patent is extended or adjusted under 35 U.S.C. 154(b) by 0 days.

(21) Appl. No.: 09/334,498

(22) Filed: Jun. 17, 1999

(30) Foreign Application Priority Data

Jun. 23, 1998 (DE) .............................................. 198 27 905

(51) Int. Cl.$^7$ ...................................................... H04B 3/36
(52) U.S. Cl. .................................. 340/407.2; 340/407.1; 434/113; 434/114; 434/117; 341/21
(58) Field of Search .............................. 340/407.1, 407.2; 434/113, 114, 115, 117; 345/168; 341/21

(56) References Cited

U.S. PATENT DOCUMENTS 4,985,692 * 1/1991 Breider et al. ..................... 340/407.1
5,164,712   11/1992 Niitsuma .
6,059,575 * 5/2000 Murphy ................................ 434/112

FOREIGN PATENT DOCUMENTS

4241937 A1 * 6/1994 (DE) .
42 41 937   6/1994 (DE) .
196 13318   7/1997 (DE) .

* cited by examiner

Primary Examiner—Julie Lieu
(74) Attorney, Agent, or Firm—Armstrong, Westerman, Hattori, McLeland & Naughton, LLP

(57) ABSTRACT

The invention relates to a data input/read-out device, including at least one output element, more particularly a Braille element, for outputting Braille data by correspondingly changing the surface profile; and at least one input element for inputting data, the input element being positionable in at least two different positions to thus enter data wherein the maximum spacing between the at least one input element and the at least one output element does not exceed a specific maximum value so that the input element and the output element can be touched or actuated simultaneously by one hand.

17 Claims, 1 Drawing Sheet

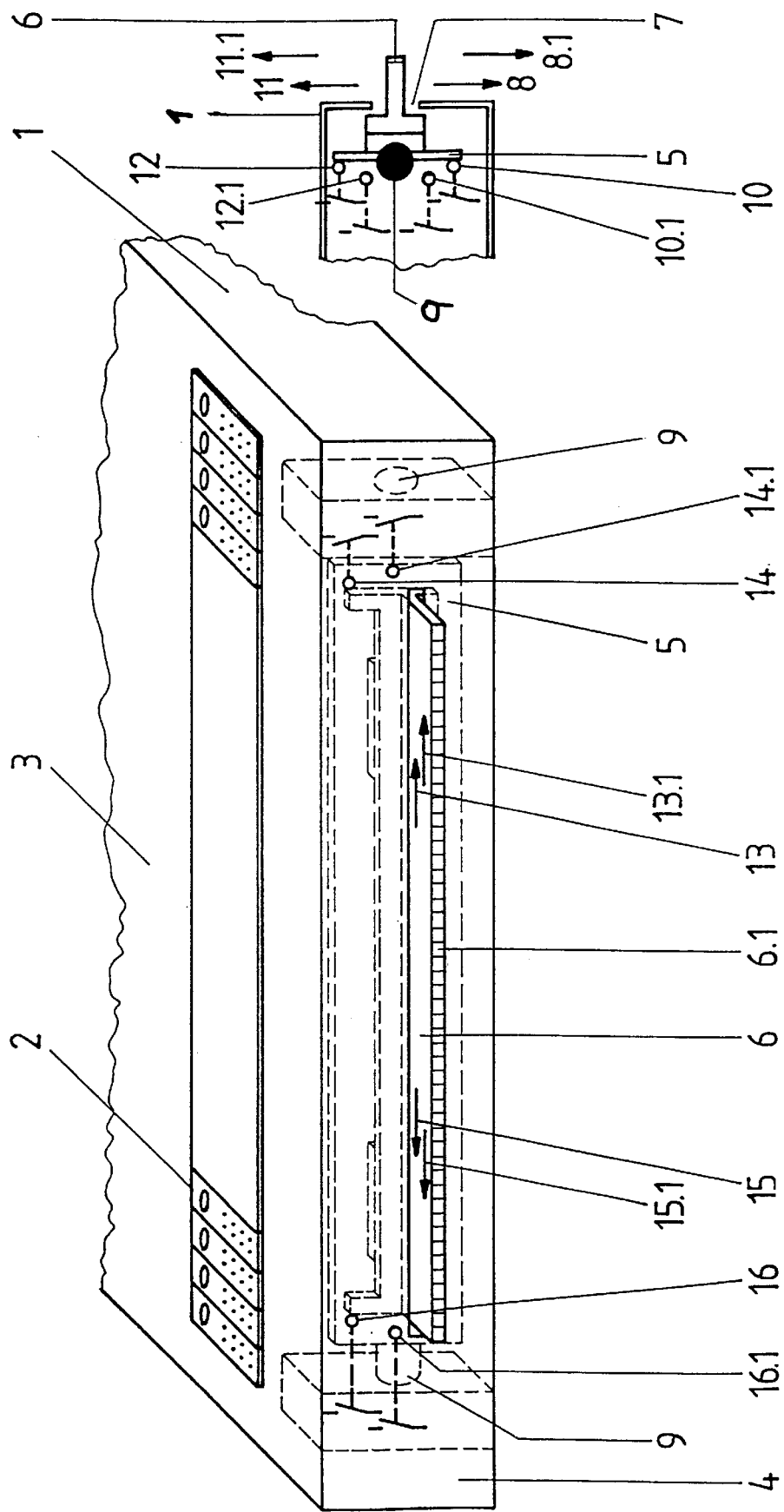

DEVICE FOR THE INPUT AND READ-OUT OF DATA

BACKGROUND OF THE INVENTION

1. Field of the Invention

The invention relates to a data input/read-out device, more particularly a tactile display, including at least one output element, more particularly a Braille element, for outputting Braille data by correspondingly changing the surface profile; and at least one input element for inputting data, the input element being positionable in at least two different positions to thus enter data; wherein the maximum spacing between the at least one input element and the at least one output element does not exceed a specific maximum value so that the input element and the output element can be touched or actuated simultaneously by one hand to trigger several different control commands independently of the position.

2. Description of Prior Art

So-called tactile displays, such as, for example, Braille script output devices, also termed Braille bars, with which blind PC users are able to read out the information contents from displays, have been known for a long time. They comprise as a rule a housing, a plurality of Braille modules arranged mostly in-line on the housing surface and several keys as well as switches serving as input elements or control pulse generators, some of which are arranged parallel to the Braille module row, on the front narrow side of the housing.

When during readout of the Braille bar a specific control information is required, this can be entered, e.g., by thumbing the corresponding control pulse generator. For this purpose the user must always leave the position attained by the reading hand when the corresponding reading position and the control pulse generator position are not located under each other, which is usually the case.

One Braille output device known in actual practice is disclosed in the prospectus "BRAILLEX 2D-Screen" of the firm F. H. Papenmeier GmbH & Co. KG, D-58239 Schwerte, Germany. Arranged on the slanted front narrow side of the low-profile housing are the various control pulse generators needed by a blind operator working with the Braille bar at the PC workstation.

This arrangement of the Braille bar and the control pulse generators arranged parallel thereto on the slanted front narrow side of the housing enables the user when reading out the Braille bar, which is done, as is known, by at least one finger tip of one hand, to actuate the control pulse generators, e.g., with the thumb, whereby in most cases the reading hand of the user must leave the attained reading position.

Another known Braille output device is disclosed in the prospectus "BRAILLEX Compact" of the same firm as stated above. Here too, in most cases, actuating the control pulse generators with the thumb on the front slanted side of the housing necessitates having to leave the respective reading position on the Braille bar.

These devices known to the practice have, however, several disadvantages:

In most cases, the user must leave the reading position he has just attained in order to thumb the control pulse generators during Braille reading. Furthermore, having to move the position of the hand or hands back and forth between Braille reading and actuating the control pulse generators requires added concentration leading to earlier tiredness and mistakes. In addition, relocating the reading position previously left takes time which has a disadvantageous effect on working efficiency.

SUMMARY OF THE INVENTION

Thus, the object of the present invention is to provide a tactile display including at least one output element, more particularly a Braille element, for outputting Braille data by correspondingly changing the surface profile; and at least one input element for inputting data, the input element being positionable in at least two different positions to thus enter data which alleviates the disadvantages listed above. More particularly, the object is to configure an input device, e.g. a control pulse generator so that it can be actuated during Braille reading in all reading positions without the reading hand or hands having to leave the respective reading position.

This is achieved in that the maximum spacing between the at least one input element and the at least one output element does not exceed a specific maximum value so that the input element and the output element can be touched or actuated simultaneously by the one hand to trigger several different control commands independently of the position, or in that the input element is formed by a control bar; the spacing between the control bar and the Braille module row is defined so that every Braille module of the row and the control bar can be simultaneously touched and thus actuated with one hand to trigger control commands independently of the position by means of the control bar.

Preferred embodiments are defined in the sub-claims.

The advantages associated with the invention are based on the following configuration of the device in accordance with the invention: The input element, which must not necessarily be configured as a single element but may, for example, consist of two or more separate elements, is arranged as regards the output elements, e.g., the Braille elements, so that the maximum spacing between the input element and the output elements does not exceed a specific maximum value, this maximum value being dimensioned so that the output element or elements can be simultaneously touched with one hand to read out information and actuate the input element without interrupting contact with the input element. The maximum value may range, e.g., from 15 to 25 cm, the preferable value being approx. 20 cm. Since the input element is configured so that the spacing to the output element(s) does not exceed a maximum value, the user of the device in accordance with the invention no longer has to remove his reading hand, resting on the output elements, from a reading position just attained so as to be able to actuate the input element. In other words, the user is now able to trigger several different control commands, independently of the position.

Due to the configuration in accordance with the invention, the input element is spaced away from every output element or only spaced away from a certain array of output elements so that when at least one hand or one finger is placed on the output elements for reading, the input element may be actuated with another finger of the same hand, e.g. the thumb, the reading finger being able to remain on the actual reading position of the output elements. Now, since there is no need to leave the reading position for actuating the input element, the user is relieved of the time-consuming task of relocating the most recent reading position. Consequently, the device in accordance with the invention considerably boosts working efficiency, thus the operation of said device is faster and more relaxing for the user. In addition, work can also be done with fewer mistakes since there are now no interruptions during reading.

Another advantage of the device in accordance with the invention is that newly retrieved information can be instantly read by suitably actuating the input element in the respective reading position. This is particularly of great help when working with tables which with input/output devices known hitherto is an awkward operation and, consequently, very prone to mistakes.

DETAILED DESCRIPTION OF THE PREFERRED EMBODIMENTS

In a preferred embodiment of the invention, the input element is a control bar arranged to advantage parallel to the output elements, e.g., the Braille elements. This control bar may be configured longer or just as long as the line of output elements. It is also conceivable, however, to configure the control bar shorter than the line of output elements, it then being necessary to ensure that the control bar continues to remain accessible with one hand and that, e.g., thumb actuation is possible when an output element located on the edge of the output element line is read with one finger, without having to remove the finger from the output element, e.g., the Braille element.

It is likewise conceivable that the input element, or the control bar, consists of two or more subdivided elements which can be actuated independently of each other. This would be of advantage to fast Braille readers who are able to read two-handedly. Here, care most be taken that, for example, in the case of a two-part input element or a control bar made up of two elements having, for instance, a right and left part, each of these two parts of the input element is arranged so that as regards a first array of output elements arranged e.g. on the right, the first input element is at such a maximum distance from the first array of output elements that, during reading of each and every output element of the first array of output elements, the first input element can be actuated with one hand without having to leave the reading position on any output element of the first array of output elements.

Correspondingly, the second, e.g. left hand, input element is arranged relative to a second, e.g. left hand, array of output elements so that, using one hand, both reading and input is possible at the same time, as described above. Thus, for instance, when a division into a left and a right portion is made, highly efficient two-handed operation is possible, wherein a first or a second array of output elements can be read with each hand whilst the first and second input elements assigned thereto in each case can be operated with the left or right hand without needing to remove the respective hand from the array of output elements assigned thereto in each case. In this arrangement particular care needs to be taken, as mentioned above, to ensure that the output elements located on the edge of the corresponding output array are still arranged so that this edge reading position also does not have to be left in order to operate the corresponding input element.

It is, of course, just as possible to configure the device in accordance with the invention with the input element in three separate parts, or even in further sub-divisions, the corresponding input elements then being assigned the corresponding output elements in each case.

In the configuration of the device in accordance with the invention as just described it is also possible, however, to arrange specific output elements so that when these are read, also two or more input elements can be actuated without having to leave the reading position on the output element. This may, for instance, be the case when an input element located more or less parallel to an output bar is made up of, for example, two or more control elements arranged in parallel so that the user is able to select, e.g., between an upper and a lower control bar to input various control information or data. Naturally, three or more control bars can be arranged parallel to each other.

In one preferred embodiment of the invention the input element is configured so that it can be moved in a first direction so as to permit inputting of, for example, two different control data by a shift to the right or to the left. A resting location can also be provided enabling the input element to be shifted from the resting location in a first direction, e.g. parallel to a longitudinal direction of the output elements arranged at the input element, e.g. to the left and to the right to thus achieve three different conditions for inputting three different control information, wherein, e.g., in the resting location no control information is entered. However, it is just as possible to move the input element not to the left or to the right as regards the longitudinal direction of the line of output elements, but, e.g., upwards or downwards. In this arrangement it is likewise possible, as already discussed, to provide a resting location between, e.g., two different positions.

The input element, e.g. the control bar, can be placed in more than just two or three different positions in a first direction. For instance, the device in accordance with the invention can be configured so that the input device can be moved from a resting location into two, e.g., latching, right hand positions and, likewise into two latching left hand positions to thus achieve four different positions of the input element, wherein the input device may comprise a resting location between the two right hand and left hand positions.

Of course, several different input positions may also be provided in each direction which advantageously latch into place to indicate a certain position to the user at this time.

Another possibility is to configure the input device so that a double-click (as when working with a computer mouse) can be performed so that, by only one input switch position, different control information or data can be entered depending on whether a single click or a double-click is made.

Preferably the input device is also configured so that it is movable or can be actuated in a second direction in addition to a first direction. This may, e.g., be done by providing a control bar which can be positioned to the right, to the left, upwards and downwards in various positions, it being possible in this arrangement to configure the control bar so that it can be, e.g., pivoted around a fulcrum. The control bar can also be configured so that it can be simply moved upwards or downwards without pivoting around a fulcrum, it being of advantage in this embodiment to arrange the first and second movement direction of the input element more or less perpendicular to each other, that is, for example, right to left and upwards–downwards.

The device in accordance with the invention may also be configured so that the first and second movement direction of the input element forms an acute or obtuse angle to each other, it also being conceivable to configure the input element so that it is movable in more than just two different directions to thus increase the number of different data or control information entered. In the preferred embodiment of the invention as described above comprising more than one direction of movement of the input element, more than just one or two specific input positions can be provided in each direction of movement of the input element to thereby increase the number of data or control information that may be input.

It is of advantage to configure the input device, for example, the control bar, so that its surface is not smooth but rather roughened, so as to prevent contact from slipping out of place during operation.

BRIEF DESCRIPTION OF THE DRAWINGS

The invention will now be described by way of a preferred embodiment with reference to the drawings in which:

FIG. 1 illustrates one embodiment of the device in accordance with the invention; and FIG. 2 is a side view of the switch/control bar.

DETAILED DESCRIPTION

The output device, such as, for example, a tactile display, also termed Braille bar, consists of a housing 1 and a Braille module row 2 on the housing surface 3. Arranged in the front narrow side 4 of the housing is the switch bar 5 protruding through the housing slot 7 by its control/key bar 6 and the knurled edge 6.1 thereof.

The mode of operation for one switching position each of the control/key bar 6 in one direction of movement in each case will now be described:

When the control/key bar 6 is thumbed downwards in the direction 8, the switch bar 5 pivots around the fulcrum 9 downwards, thereby clicking ON the key 10, whereas when the control/key bar 6 is moved upwards in the direction 11, the switch bar 5 pivots around the fulcrum 9 upwards, thereby clicking ON the key 12.

Due to the horizontal displacement of the switch bar 5 with the aid of the control/key bar 6 in the fulcrum 9 to the right in the direction 13, the key 14 is clicked ON, and when moved to the left in the direction 15 the key 16 is clicked ON.

The mode of operation of the device in accordance with the invention for two specific positions each of the control/key bar 6 in one direction is as follows:

When the control/key bar 6 is thumbed downwards in the direction 8.1, the switch bar 5 pivots around the fulcrum 9 beyond the latching position of the first plane, thereby clicking ON the key 10.1, whereas when the control/key bar 6 is thumbed upwards in the direction 11.1 ,the switch bar 5 pivots around the fulcrum 9, likewise beyond the latching position of the first plane, and clicks ON the key 12.1.

Due to the horizontal displacement of the switch bar 5 with the aid of the key bar 6 in the fulcrum 9 to the right in the direction 13.1, the key 14.1 located adjacent to the key 14 is clicked ON, and when moved in the direction 15.1, the key 16.1 adjacent to the key 16 is clicked ON.

Resetting the control bar to zero each time occurs by the return force of the keys, e.g. by means of a spring element. By double-clicking the keys, the number of control pulses for inputting can easily be multiplied.

In the case of very long Braille bars 2, the switch bar 5 with assigned key bar 6 may be divided to make for a stable arrangement.

The invention thus provides a one or multi-part elongated multi-switch which is capable of being enabled on the Braille bar in the same way (with the same function) from any reading position, thereby achieving the object as cited at the outset.

What is claimed is:

1. A data input/read-out device comprising:
   a) at least one output element, more particularly a Braille element, for outputting Braille data by correspondingly changing the surface profile; and
   b) at least one input element for inputting data, the input element being positionable in at least three different positions to thus enter data; wherein
   c) the maximum spacing between the at least one input element and the at least one output element does not exceed a specific maximum value so that the input element and the output element can be touched or actuated simultaneously by one hand to trigger several different control commands independently of the position of the hand.

2. The device as set forth in claim 1, wherein said input element is a control bar running substantially parallel to said output elements.

3. The device as set forth in claim 2, wherein said control bar consists of at least two independently actuatable control bar elements.

4. The device as set forth in claim 1, wherein said input element is shiftable in a first direction.

5. The device as set forth in claim 4, wherein said input element is movable in a second direction.

6. The device as set forth in claim 5, wherein said second direction is roughly perpendicular to said first direction.

7. The device as set forth in claim 5, wherein said input element is positionable into at least three different positions for thus entering three different data.

8. The device as set forth in claim 1, wherein the surface of said input element is not smooth.

9. A data input/read-out device comprising:
   a) a Braille module row for outputting Braille data by correspondingly changing the surface profile; and
   b) at least one input element running parallel to said braille module row for inputting control pulses,
   c) said input element being positionable into three different positions, wherein
   d) said input element is formed by a control bar, and
   e) the spacing between said control bar and said Braille module row is defined so that every braille module of said row and said control bar can be simultaneously touched with one hand and thereby actuated to trigger control pulses independently of said positions by means of said control bar.

10. The device as set forth in claim 9, wherein said control bar consists of at least two independently actuatable control bar elements.

11. The device as set forth in claim 9, wherein said input element is shiftable in a first direction.

12. The device as set forth in claim 11, wherein said input element is movable in a second direction.

13. The device as set forth in claim 12, wherein said second direction is roughly perpendicular or to the said first direction.

14. The device as set forth in claim 12, wherein said input element is positionable into at least three different positions for entering three different data.

15. The device as set forth in claim 11, wherein said input element is positionable into at least three different positions in said first direction for entering three different information.

16. The device as set forth in claim 9, wherein the surface of said input element is not smooth.

17. A data input/read-out device comprising:
   at least one output element, more particularly a Braille element, for outputting Braille data by correspondingly changing the surface profile; and
   at least one input element for inputting data, the input element being positionable in different positions to thus enter data, wherein the maximum spacing between the at least one input element and the at least one output element does not exceed a specific maximum value so that the input element and the output element can be touched or actuated simultaneously by one hand to trigger several different control commands independently of the position, said input element is shiftable in a first direction, and said input element is positionable into at least three different positions in said first direction for entering three different information.

* * * * *